US007061482B2

(12) United States Patent
Ferris

(10) Patent No.: US 7,061,482 B2
(45) Date of Patent: Jun. 13, 2006

(54) DIGITAL TRANSACTIONS FOR THE DELIVERY OF MEDIA FILES

(75) Inventor: Gavin Robert Ferris, London (GB)

(73) Assignee: Radioscape Limited (GB)

( * ) Notice: Subject to any disclaimer, the term of this patent is extended or adjusted under 35 U.S.C. 154(b) by 223 days.

(21) Appl. No.: 10/332,345

(22) PCT Filed: Jul. 9, 2001

(86) PCT No.: PCT/GB01/03069

§ 371 (c)(1),
(2), (4) Date: Jan. 6, 2003

(87) PCT Pub. No.: WO02/05112

PCT Pub. Date: Jan. 17, 2002

(65) Prior Publication Data

US 2004/0006634 A1 Jan. 8, 2004

(30) Foreign Application Priority Data

Jul. 8, 2000 (GB) ............................................ 0016695

(51) Int. Cl.
*G06T 1/00* (2006.01)

(52) U.S. Cl. ....................... 345/302; 709/224; 709/226; 707/104; 707/105

(58) Field of Classification Search ................. 345/302; 709/224, 226–228, 203, 220; 707/104, 105; 705/9, 14, 26
See application file for complete search history.

(56) References Cited

U.S. PATENT DOCUMENTS 5,396,417 A * 3/1995 Burks et al. .................. 705/17
5,706,427 A * 1/1998 Tabuki ....................... 713/201
5,819,160 A * 10/1998 Foladare et al. .............. 455/45
5,943,422 A * 8/1999 Van Wie et al. .............. 705/54
5,953,005 A * 9/1999 Liu ......................... 715/500.1
6,038,591 A * 3/2000 Wolfe et al. ................ 709/206
6,144,375 A * 11/2000 Jain et al. ................ 715/500.1
6,248,946 B1 * 6/2001 Dwek .......................... 84/609
6,292,786 B1 * 9/2001 Deaton et al. ................ 705/14
6,351,733 B1 * 2/2002 Saunders et al. ........... 704/500
6,385,596 B1 * 5/2002 Wiser et al. .................. 705/51
6,502,194 B1 * 12/2002 Berman et al. ............. 713/201
6,670,537 B1 * 12/2003 Hughes et al. ................ 84/609
6,772,127 B1 * 8/2004 Saunders et al. ........... 704/500

OTHER PUBLICATIONS

The Use of network Delay Estimation for Multimedia data Retrieval, Gibbon et al., IEEE 1996, vol. 14. No. 7, pp. 1376–1387.*
Oliver Merkel et al., Protecting VoD the Easier Way, ACM Multimedia, 1998, pp. 21–28.*

* cited by examiner

*Primary Examiner*—Khanh Quang Dinh
(74) *Attorney, Agent, or Firm*—Synnestvedt Lechner & Woodbridge, LLP; Richard C. Woodbridge, Esq.; Thomas J. Onka, Esq.

(57) ABSTRACT

An incomplete/partly corrupted media file is delivered 'in the clear'; in addition, a delta file is delivered to users meeting access control criteria which, when combined with the incomplete/partly corrupted parts allows a complete and uncorrupted version of the media file to be re-constructed. The method allows, in one implementation, a secure music purchase system to operate over digital radio: for example, the start of a song when played over the radio is usually deliberately talked over and the end cut short to prevent listeners being able to record a complete copy. With the present system, this practice can continue, but listeners can also purchase the missing or corrupted sections to enable them to possess a complete and uncorrupted version for playback.

26 Claims, 1 Drawing Sheet

DIGITAL TRANSACTIONS FOR THE DELIVERY OF MEDIA FILES

CROSS REFERENCE TO RELATED APPLICATIONS

This application claims the priority of PCT Application No. PCT/GB01/03069 filed Jul. 9, 2001 and British application GB 0016695.9 filed Jul. 8, 2000.

BACKGROUND OF THE INVENTION

1. Field of the Invention

This invention relates to the field of digital transactions, particularly to transactions in which copies of digital media files are acquired. The media files are typically music files (but can be any other type of media file) and the delivery mechanism may be, but is not limited to, a digital radio transmission such as DAB (Eureka-147) or the Internet.

2. Description of the Prior Art

Conventional analogue radio systems (such as FM or AM) can cause significant channel noise to be introduced into the transmitted audio signal payload; the payload is in any event generally rendered into the analogue domain before being allowed to modulate the carrier. As a result, analogue systems are inappropriate vehicles for selling music directly, since any recording will be significantly compromised with respect to the (in these days, usually digital) original which can be purchased through conventional music stores (e.g., as a CD) or through the Internet (e.g., as an MP3 file).

However, with the introduction of digital radio systems (e.g., the Eureka-147 standard adopted throughout the UK, Europe and elsewhere) the possibility of the direct sale of digital music 'over the air' appears, at first, to become a significant possibility. This is because:

Digital sources are used. The source music is encoded using a digital compression system (e.g., Musicam (a slight variant of MPEG1layer-2 and MPEG2-layer-2 audio) for Eureka-147 DAB). Therefore, there is little, if any, perceptible difference between the material put to air and that which can be purchased by the user though the normal commercial channels, as described above.

The received signal will be, for most users, an exact copy of that which was transmitted. Modern digital radio systems all contain some form of forward error correction (FEC). This involves the addition of structured redundancy to the transmitted signal so that the receiver can accurately infer the intended payload message, even in the face of significant corruption by the channel. Coupled with checksum tests on the audio, and channel error temporal and frequency decoherence mechanisms, this means that digital radios tend to have so-called 'cliff-effect' reception—either the received audio is exactly that which, bit-for-bit, left the studio, or no signal at all is received. This must be contrasted with analogue radio, in which most channel corruptions become directly perceptible within the delivered audio signal.

Potential lack of source compression. Analogue radio systems often artificially compress the source material spectrum in order to make their signal appear 'louder' (useful e.g., for in car listening where the ambient noise level is high and quiet passages can be lost). Digital radio systems can (although they need not) avoid this problem, through the use of mechanisms such as the Eureka-147 dynamic range control, in which compression is performed at the receiver end.

These three points, taken together, mean that the digital radio user receives, essentially, a digital 'clone' of the original message. This is (minus packaging) what the user would be able to purchase through the normal channels discussed above, hence the possibility of commercial sale of the material 'downloaded' over the air. The commercial sale of material 'downloaded' over the Internet already occurs of course.

However, using radio as the vehicle for the commercial sale of music turns out not to be practicable using existing known mechanisms, in the general case, for the following reasons:

Radio stations tend not to transmit all of a particular music item—for example they will often 'cut' the start and ends of popular music tracks to make them fit a particular play slot. (This is also a problem with 'classic request' channels which may play only one movement from a classical piece, or worse, a selection from a single movement).

The radio station will often impose corruptions onto the transmitted item—for example, 'fades' at the start and end of a track, the disk jockey talking over certain parts of a track, special effects, adverts or jingles overlaid on the track, etc.

Even if the above two factors were not a concern, then piracy would prove problematical for the music vendor. This is because, in order for the radio to play the track, the music will have to be transmitted, to all intents and purposes, 'in the clear'. However, for security, the track would need to be encrypted, only to be unlocked by an authorised purchasing key.

SUMMARY OF THE PRESENT INVENTION

In accordance with a first aspect of the present invention, there is provided a method of delivering a digital media file comprising the following steps:

(a) dividing a master version of a digital media file into a first series of time frames and a second series of time frames;

(b) delivering the first series of time frames to one or more users without any form of access control, the first series capable of being used to form a version of the media file which is incomplete and/or corrupted;

(c) delivering the second series of time frames to one or more users, the second series capable of being used in conjunction with the first series to form a version of the media file which is complete and uncorrupted, in which access to the second series is only granted to users satisfying defined access control criteria.

Hence, the method envisages delivering an incomplete/partly corrupted media file 'in the clear'; in addition, a delta file is delivered to users meeting access control criteria which, when combined with the incomplete/partly corrupted parts allows a complete and uncorrupted version of the media file to be reconstructed. The method allows, in one implementation, a secure music purchase system to operate over digital radio: for example, the start of a song when played over the radio is usually deliberately talked over and the end cut short to prevent listeners being able to record a complete copy. With the present system, this practice can continue, but listeners can also purchase the missing or corrupted sections to enable them to possess a complete and uncorrupted version for playback. Hence, spontaneous purchasing of complete, played over the air tracks is possible, which is not only very convenient for listeners but highly attractive for content owners and radio stations.

In a second aspect, there is a method of receiving a digital media file at a receiving device, the media file being held at a remote source as a master version divided into a first series of time frames and a second series of time frames; the method comprising the following steps:

(a) receiving at the receiving device the first series of time frames, the first series capable of being used by the receiving device to form a version of the media file which is incomplete and/or corrupted;

(b) receiving at the receiving device the second series of time frames, the second series capable of being used by the receiving device in conjunction with the first series to form a version of the media file which is complete and uncorrupted, in which access to the second series is only possible if the receiving device satisfies defined access control criteria.

In a third aspect, there is an apparatus for processing a digital media file, the apparatus programmed to:

(a) divide a master version of a digital media file into a first series of time frames and a second series of time frames;

(b) send the first series of time frames, the first series capable of being used at a receiving device without any form of access control to form a version of the media file which is incomplete and/or corrupted;

(c) send the second series of time frames, the second series capable of being used at the receiving device in conjunction with the first series to form a version of the media file which is complete and uncorrupted, in which access to the second series is only granted to users satisfying defined access control criteria.

In a forth aspect, there is an apparatus for receiving a digital media file, the media file being held at a remote source as a master version divided into a first series of time frames and a second series of time frames; the apparatus programmed to:

(a) receive the first series of time frames, the first series capable of being used by the receiving device to form a version of the media file which is incomplete and/or corrupted;

(b) receive the second series of time frames, the second series capable of being used by the receiving device in conjunction with the first series to form a version of the media file which is complete and uncorrupted, in which access to the second series is only possible if the receiving device satisfies defined access control criteria.

In a fifth aspect, there is a media file structured into a first series of time frames and a second series of time frames; the first series capable of being used by a receiving device to form a version of the media file which is incomplete and/or corrupted; the second series of time frames capable of being used by the receiving device in conjunction with the first series to form a version of the media file which is complete and uncorrupted, in which access to the second series is only possible if the receiving device satisfies defined access control criteria.

In a sixth aspect, there is provided a method of selling media files, in which the method comprises a method of delivering in accordance with the first aspect of the invention, the delivery of the second series of time frames being paid for by a user.

BRIEF DESCRIPTION OF THE DRAWINGS

The invention will be described with reference to the accompanying drawing which is a schematic overview of the present invention.

DETAILED DESCRIPTION

Figure 1:
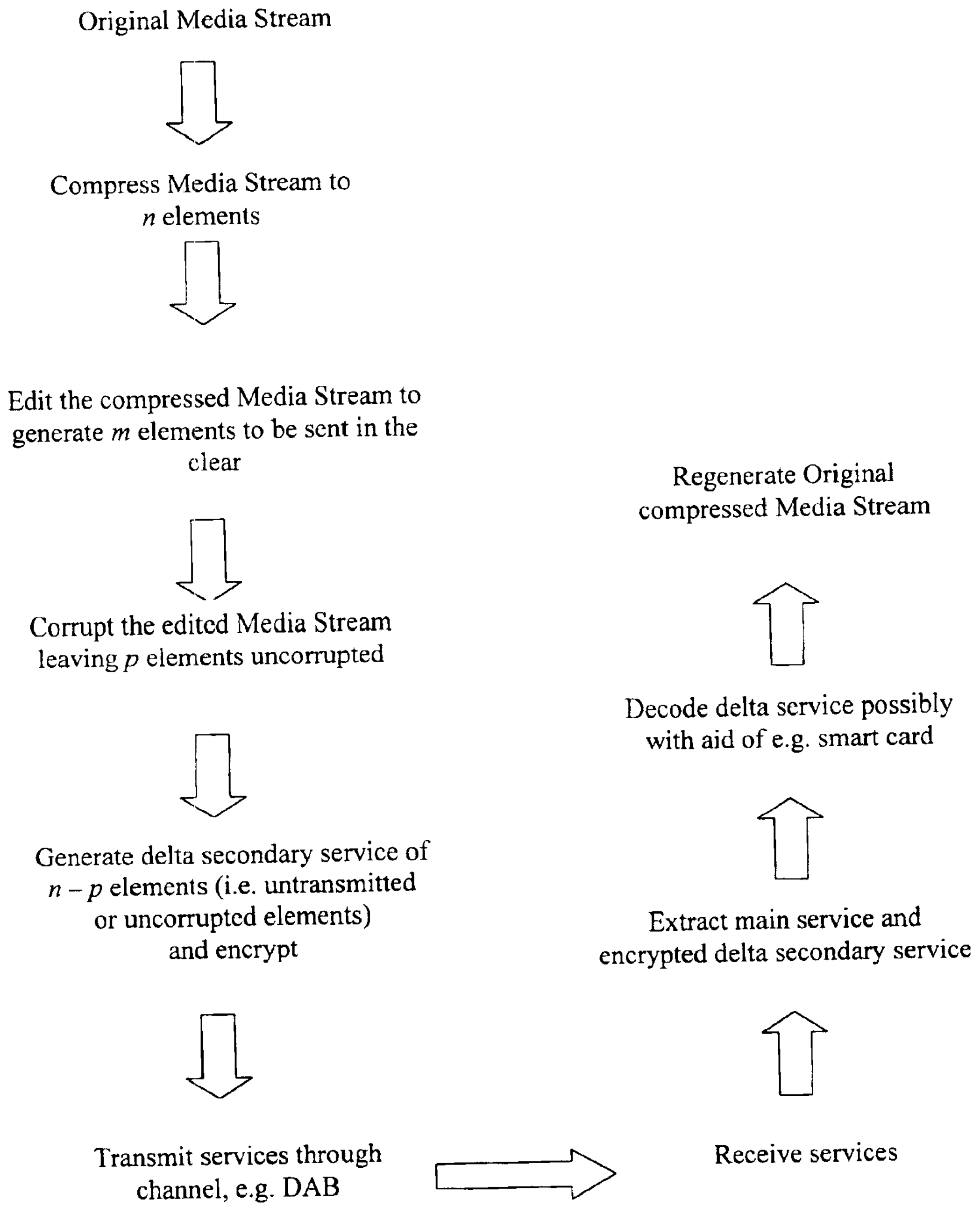

The radio implementation operates by identifying the fact that the majority of modern audio encoding systems break information up into frames in the time domain, (which may or may not be of the same length in time as each other but which, without loss of generality, we shall assume in this discussion are of the same length).

Therefore, given a piece of merchantable audio material A, the digital audio playout system at the studio can generate a frame-wise compressed version $A_0, A_1, A_2, \ldots A_{n-1}$. Of these n frames, only m<=n will be transmitted, and of these m, only p<=m will be uncorrupted. Assume that the studio audio playout system maintains a log of which frames are transmitted uncorrupted to air, and which are either not sent at all, or are sent with some corruption. Corruption can also arise through reception errors, which will vary from user to user.

Then the possibility exists, to generate a second stream, generally much smaller than the first, consisting of only those n−p un-transmitted or uncorrupted frames (in their original, pristine format), which may be encrypted and sent to air as an additional service. (This is a straightforward task with a system such as Eureka-147 DAB in which the multiplex can be rapidly reconfigured to hold new data or audio services, in stream or packet mode, provided that an overall payload limit is not exceeded, and can even allow data services to be embedded within extra space allocated within the audio frames themselves).

With such a system, the receiver would be able to play the received music, which, in the normal case, would consist of the m transmitted frames, m−p of which would be corrupt, and n−m of which would be missing. The user could record this should they so desire, but it would (in the general case where p<m<n) be much less desirable than the genuine, uncut, unblemished original that could be purchased though the conventional channels discussed earlier.

However, in a receiver equipped with the appropriate decoder module, the user could record the message transmitted 'in the clear', together with the 'delta' stream. This 'delta' stream would have been decoded from the appropriate second service discussed above. If desired, he system could be configured only to be able to decode the delta stream with the assistance of a purchase authentication device, such as a 'smart card', decryption key or Internet authorization.

The receiver would then be able automatically to reassemble the original payload, by appending (from the delta stream) any un-transmitted frames into the received 'clear' message, and overwriting any corrupted frames in the 'clear' message with their pristine versions (from the delta stream). FIG. 1 is a schematic representation of this system. Generally, the corrupted frames might be deliberately corrupted by the studio; then the audio playout log maintains a record of these deliberately corrupted frames so that they can be readily incorporated into the delta stream. In addition, where corruption arises through reception errors (and therefore differs from receiver to receiver), an individual 'personalised' delta file, specific to each receiver, can be defined and requested by a receiver where a back channel is available.

The resulting stream could be node-locked if desired to prevent the purchased music from being portable (and indeed this facility could be applied simply by ensuring that the delta frames were node-locked), although generating a fully clear final message would also be an option. Hence, serial copy inhibition can be provided for by making the delta frames readable only by a specific device, using a unique ID of that device.

The system could also be incorporated within a 'circular buffer recording' unit such that the last q seconds of audio received (together with any appropriate delta files, still in encrypted form) would be held in store, such that a user would be able to initiate a recording of an item at some time after it had commenced playing (perhaps even after it had finished).

This system would yield significant benefits for broadcasters, end users and music vendors alike, allowing the traditional benefits of radio (e.g., first play of new 'hit' songs which are of interest to users and help stimulate the market for music vendors) to be turned into a subsequent sale, without either the vendors running a significant risk of music piracy or the users having to suffer a long secondary download of music that (for the most part) they have already received. The system enables music lovers for the first time to spontaneously purchase a music track, album etc, on hearing that piece of music played on the radio.

Note that this system could also be deployed in a form where the delta file was downloaded directly via a two-way communications system (e.g., over a cellular channel, or via the Internet). This system would require that the user made a generally short) connection to download the delta file, but would have the following additional advantages:

The music vendor could identify and directly authenticate the user in question, therefore being better able to combat fraud and offer personalised marketing incentives such as special offers for regular customers, etc.

The user could benefit because their receiver might also request additional 'personalised' delta frames which have been corrupted due to channel effects (these frames can be detected through checksum failures if this is supported in the digital radio system in question).

The system would also be appropriate for use with Internet streaming in place of digital radio. The system would be appropriate for any media stream, including video, not limited to audio, although its primary intended target would be digital radio.

What is claimed is:

1. A method of delivering a digital media file to a receiving device, comprising the following steps:

a) dividing a master version of a digital media file into a first series of time frames and a second series of different time frames;

b) delivering the first series of time frames to one or mote users without any form of access control, the first series capable of being used to form a version of the media file which is incomplete and/or corrupted;

c) delivering the second series of time frames to one or more said users the second series capable of being re-combined with the first series to form a re-assembled version of the media file which is complete and uncorrupted, in which access to the second series is only granted to users satisfying defined access control criteria;

wherein the receiving device automatically records a defined time period of the first series of time frames irrespective of any user selection of a record function of the receiving device; and wherein the defined period is adequate to enable a user to record an entire media work even though the user only selects the record function of the device substantially after commencement of receiving the media work.

2. The method of claim 1 in which the second series is encrypted.

3. The method of claim 1 in which any time frames missing and/or corrupted in the first series of time frames are present in an uncorrupted form in the second series.

4. The method of claim 1 in which the second series is transmitted together with the first series.

5. The method of claim 1 in which the second series is transmitted separately from the first series in response to a user request.

6. The method of claim 5 in which the user request specifies any first frames which are corrupted.

7. The method of claim 1 in which the media file is a music file broadcast over digital radio.

8. The method of claim 1 in which the media file is a media file streamed over the Internet.

9. The method of claim 1 in which the version of the media file which is complete and uncorrupted is structured to be reproducible only at a specific user receiving device to prevent serial copying.

10. The method of claim 9 in which the second series of time frames is node locked to render the version of the media file which is complete and uncorrupted to be reproducible only at a specific user receiving device.

11. A method of selling media files, in which the method comprises a method of delivering in accordance with claim 1, the delivery of the second series of time frames being paid for by a user.

12. A method of receiving a digital media file at a receiving device, the media file being held at a remote source as a master version divided into a first series of time frames and second series of different time frames, the method comprising the following steps:

a) receiving at the receiving device the first series of time frames, the first series capable of being used by the receiving device to form a version of the media file which is incomplete and/or corrupted;

b) receiving at the receiving device the second series of time frames, the second series capable of being re-combined by the receiving device with the first series to form a version of the media file which is complete and uncorrupted, in which access to the second series is only possible if the receiving device satisfies defined access control criteria;

wherein the receiving device automatically records a defined time period of the first series of time frames irrespective of any user selection of a record function of the receiving device; and wherein the defined period is adequate to enable a user to record an entire media work even though the user only selects the record function of the device substantially after commencement of receiving the media work.

13. The method of claim 12 in which the second series is transmitted separately from the first series in response to a request from the receiving device.

14. The method of claim 13 in which the receiving device specifies any first frames which are corrupted.

15. The method of claim 12 in which the media file is a music file broadcast over digital radio.

16. The method of claim 12 in which the media file is a media file streamed over the Internet.

17. The method of claim 12 in which the version of the media file which is complete and uncorrupted is structured to be reproducible only at a specific user receiving device to prevent serial copying.

18. The method of claim 17 in which the second series of time frames is node locked to render the version of the media file which is complete and uncorrupted to be reproducible only at a specific user receiving device.

19. An apparatus for processing a digital media file, the apparatus programmed to:

a) divide a master version of a digital media file into a first series of time frames and a second series of different time frames;

b) send the first series of time frames, the first series capable of being used at a receiving device without any form of access control to form a version of the media file which is incomplete and/or corrupted;

c) send the second series of time frames, the second series capable of being re-combined at the receiving device with the first series to form a version of the media file which is complete and uncorrupted, in which access to the second series is only granted to users satisfying defined access control criteria;

wherein the apparatus automatically records a defined time period of each of the first and second series of time frames irrespective of any user selection of a record function of the apparatus; and wherein the defined period is adequate to enable a user to record an entire media work even though the user only selects the record function of the device substantially after commencement of receiving the media work.

20. The apparatus of claim 19 in which the first and second series of time frames are sent to another apparatus located at the same site as the apparatus.

21. The apparatus of claim 19 in which the first and second series of time frames are sent to another apparatus located remotely from the site of the apparatus.

22. An apparatus for receiving a digital media file at a receiving device, the media file being held at a remote source as a master version divided into a first series of time frames and second series of different time frames, the apparatus programmed to:

a) receive the first series of time frames, the first series capable of being used to form a version of the media file which is incomplete and/or corrupted;

b) receive the second series of time frames, the second series capable of being re-combined with the first series to form a version of the media file which is complete and uncorrupted, in which access to the second series is only possible if the receiving device satisfies defined access control criteria;

wherein the apparatus automatically records a defined time period of each of the first and second series of time frames irrespective of any user selection of a record function of the apparatus; and wherein the defined period is adequate to enable a user to record an entire media work even though the user only selects the record function of the device substantially after commencement of receiving the media work.

23. The apparatus of claim 22 in which the second series is transmitted separately from the first series in response to a request from the apparatus.

24. The apparatus of claim 23 in which the apparatus specifies any first frames which are corrupted.

25. The apparatus of claim 22 in which the version of the media file which is complete and uncorrupted is structured to be reproducible only at a specific user receiving device to prevent serial copying.

26. The method of claim 25 in which the second series of time frames is node locked to render the version of the media file which is complete and uncorrupted to be reproducible only at a specific user receiving device.

* * * * *